Sept. 4, 1951 W. C. DE VRIES 2,567,148

TELEPHONE SIGNALING DEVICE

Filed June 14, 1947 2 Sheets-Sheet 1

INVENTOR:
WILLEM C. DE VRIES,
BY Brown, Jackson, Boettcher & Dienner
ATTORNEYS

Sept. 4, 1951 W. C. DE VRIES 2,567,148

TELEPHONE SIGNALING DEVICE

Filed June 14, 1947 2 Sheets-Sheet 2

INVENTOR:
WILLEM C. DE VRIES,
BY Brown, Jackson, Boettcher & Dienner
ATTORNEYS

Patented Sept. 4, 1951 2,567,148

UNITED STATES PATENT OFFICE 2,567,148

TELEPHONE SIGNALING DEVICE

Willem C. de Vries, The Hague, Netherlands, assignor to Staatsbedrijf Der Posterijen, Telegrafie En Telefonie, The Hague, Netherlands Application June 14, 1947, Serial No. 754,759
In the Netherlands June 15, 1946

8 Claims. (Cl. 179—2.5)

Figures 1, 2, 3, 4:
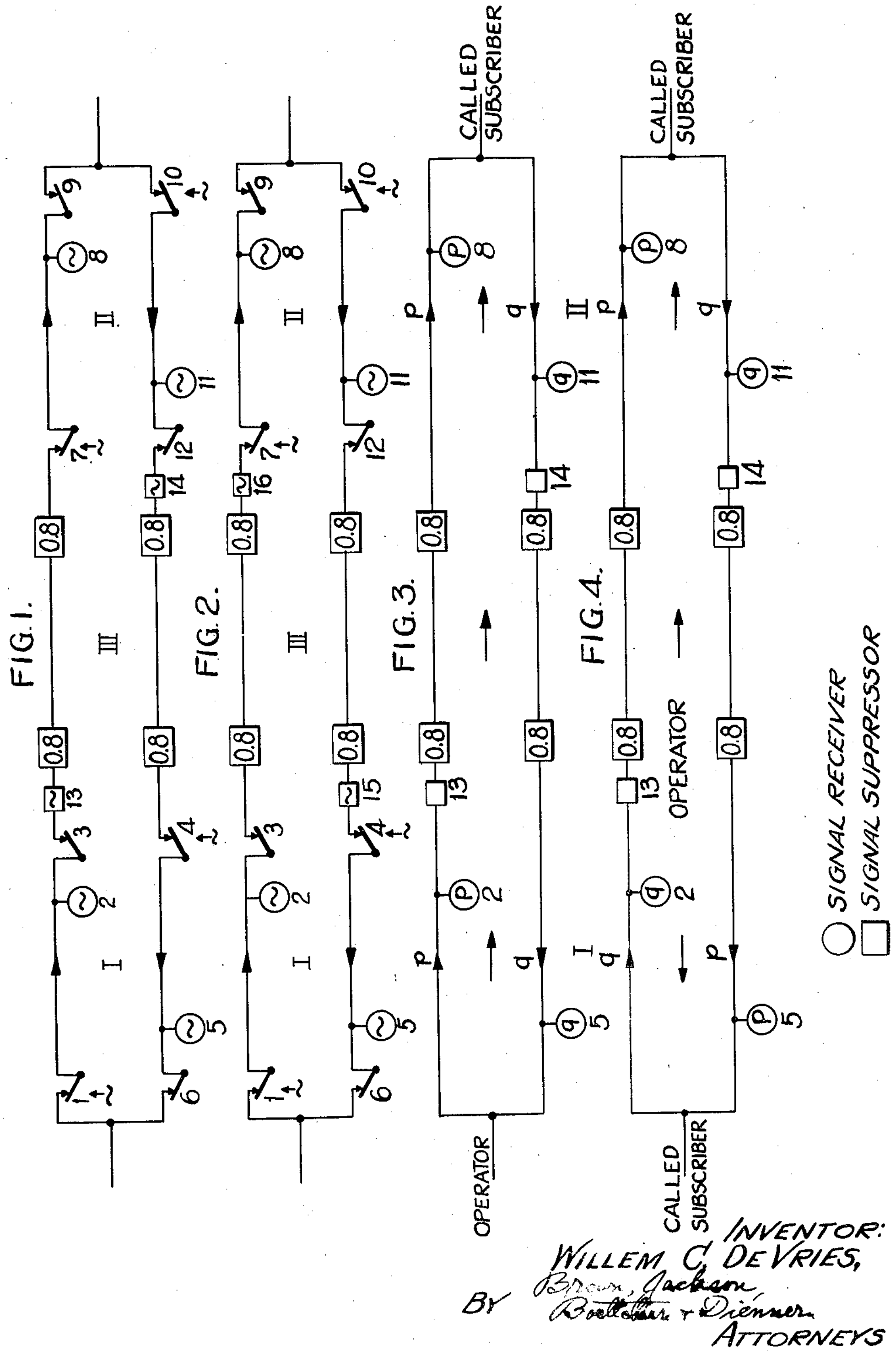

The present invention relates broadly to telephone signalling systems, and more particularly to toll, national and international telephone systems over which signalling is effected by the use of one or more signalling frequencies which lie in the frequency range of the speech band to be transmitted. If two of such telephone systems are interconnected directly, or by way of other systems, difficulties may arise if the signalling operations occurring on two or more of such systems are performed by using the same signalling frequency or frequencies, because it is then possible for the signalling frequency or frequencies of one system to unintentionally or improperly affect the signal receivers of the other system.

These undesirable conditions of interference can be avoided by providing band filters between the two telephone systems, such band filters serving to block the transmission of the signalling frequency or frequencies. However, as a result of using these band filters these particular frequencies are also suppressed in the speech band to be transmitted, and such objectionably affects the speech transmission.

Another and possibly better method in the prior art is the use of a prefix signal which functions to interrupt the speech conductor only at the transit points between the various systems, so that the normal signals which immediately follow the prefix signal cannot interfere with the signal receiver or receivers of the systems beyond. This use of a prefix signal is disclosed in British Patent No. 489,545 granted July 25, 1938. The use of such a prefix signal, which must always precede the following so-called suffix signals, is objectionable because it causes a considerable loss of time in signalling and makes the arrangement more complicated. Moreover, the use of a prefix signal may be a handicap to the introduction of new voice frequency signalling systems, and there is even a practically unsurmountable objection to the use of a prefix signal for the existing systems which use voice frequency signalling without a prefix signal, i. e. introducing a prefix signal, such as into existing national telephone systems, primarily for the sake of international cooperation between national telephone systems, would necessitate a complete reconstruction of the existing signalling systems.

The general object of the present invention is to prevent mutual interference between two telephone signalling systems working with the same frequency or frequencies in a much simpler manner than by the above-described use of a prefix signal. A further feature of the invention in this regard is that it can be applied to existing voice frequency systems which are working without a prefix signal without necessitating the total reconstruction of the signalling systems. In attaining the above objectives, the invention provides one or more signal suppressors in the connection between those telephone systems which work with the same signalling frequency or frequencies. These signal suppressors preferably operate so quickly that they practically suppress the voice frequency signals. As hereinafter described, these signal suppressors comprise a valve or thermionic tube arrangement in association with a variable attenuation network, such valve or tube being controlled by the voice frequency signal that is to be suppressed and functioning to regulate the attenuation of this variable attenuation network. As this arrangement of signal suppressors does not contain any mechanical or moving parts, such as are commonly characteristic of relays, these signal suppressors can react extremely rapidly. This period of time is so short (some micro-seconds) that a typical signal receiver comprising a vacuum tube arrangement and one or more mechanical parts, such as relay armatures and the like, cannot possibly operate on it. The signal receivers are preferably sensitive to direction, by reason of being arranged in series with the line. If the telephone systems which are to be connected and which operate with substantially the same signalling frequencies are of the 4-wire type, connected either 2-wire or 4-wire, the signal suppressors can be inserted in the over-all system in any one of the following ways: either only in the incoming speech direction, or only in the outgoing speech direction, or in the incoming as well as in the outgoing speech direction of each system.

Figures 5, 6:
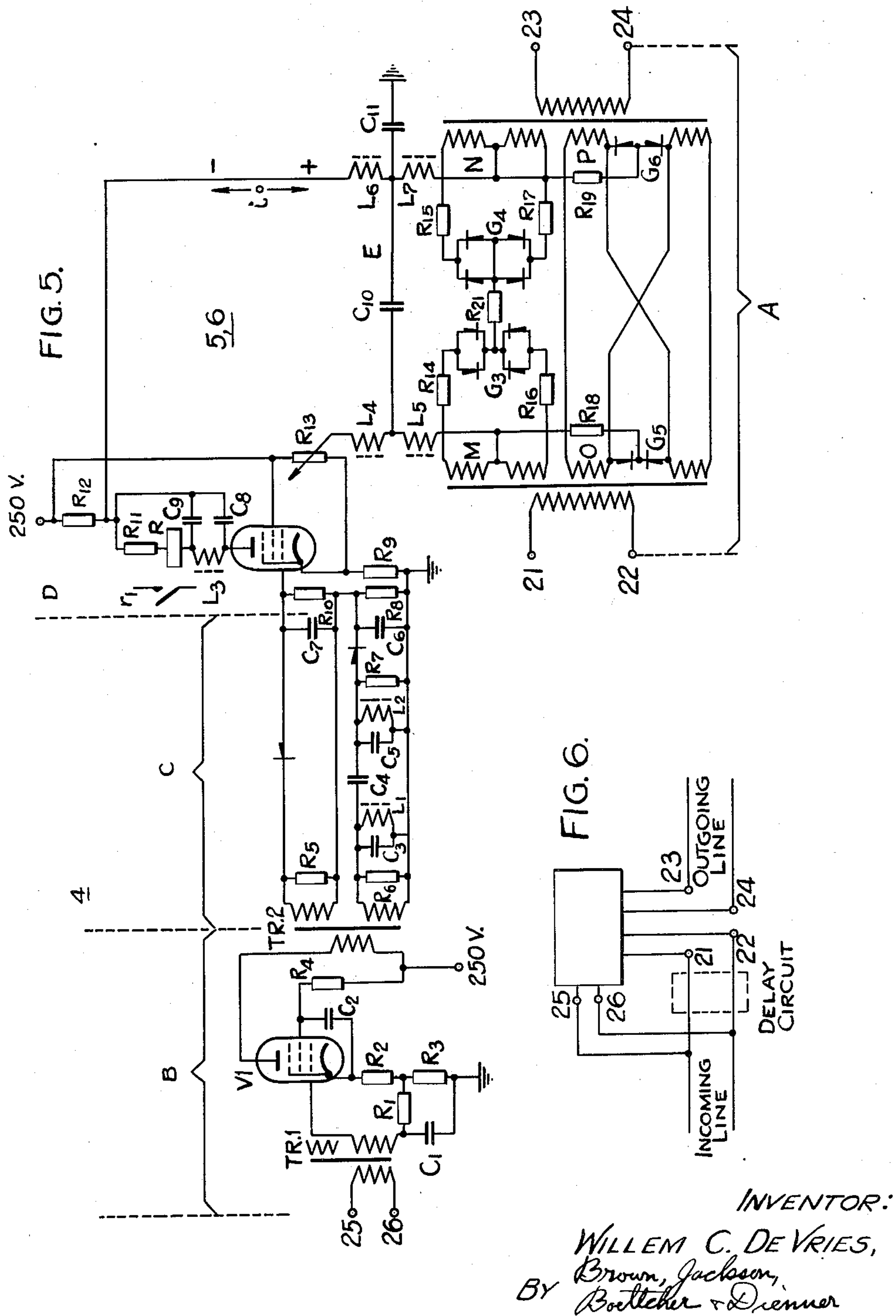

Further objects and advantages of the invention will appear from the following detailed description of certain preferred embodiments of the invention. In the accompanying drawings illustrating such embodiments:

Figures 1 and 2 are circuit diagrams schematically illustrating two different embodiments, each consisting of two 4-wire systems I and II, on which the signalling is effected with the same frequency, and which two systems have 4-wire interconnection, with separated speech directions, by way of another 4-wire system designated III, this latter system working with another signal frequency, Figures 3 and 4 are similar circuit diagrams schematically illustrating two different ways in which the 4-wire systems can be interconnected according to the diagrams of Figures 1 and 2;

Figure 5 is a schematic diagram of a signal receiver and an associated barring or signal suppressing unit; and Figure 6 is a schematic sketch of a delay circuit arrangement as used with the signalling equipment.

Each of the 4-wire systems I and II illustrated at the left hand and right hand ends, respectively, of Figures 1 and 2, can be built up automatically of several 4-wire circuits (including carrier currents) by means of selectors. With regard to the signalling systems, however, they form one unity or overall system, so that the signals would ordinarily be transmitted directly from one termination of the system to the other. Such a 4-wire system has, for example, been disclosed in my Netherlands Patent No. 36,968. As above stated, the left hand signalling system I and the right hand signalling system II are adapted to be interconnected by way of an intermediate 4-wire signalling system designated III. The signalling method employed in the intermediate system III, as well as the methods of transmitting signals between the systems I and II, and between the systems II and III, are not critical or important in the operation of the present invention, and therefore such signalling methods and transmitting methods have not been illustrated in detail in Figures 1 and 2. As well known to those skilled in the art, these four-wire telephone systems provide two separate talking circuits, two wires serving to transmit speech in one direction, and two wires serving to transmit speech in the other direction. As indicated by the directional arrows in Figure 1, the two top wires constituting the top side or leg of the three telephone systems I, II and III serve to transmit speech in a direction from left to right, i. e. in the direction I–II. Conversely, the two bottom wires constituting the bottom side or leg of the three four-wire systems I, II and III serve to transmit speech in a direction from right to left, i. e. in the direction II–I. This same directional relation of speech channels or circuits also applies to Figure 2. The left hand telephone system I has any conventional signal transmitting relay 1 and any conventional signal receiver 2 connected with the upper two-wire circuit extending in the direction I–II. It also has a signal transmitting relay 4 and signal receiver 5 connected in the lower two-wire circuit which conducts speech in the direction II–I. Referring now to the right hand telephone system II, this system likewise has a signalling transmitter 7 and signalling receiver 8 in the upper two-wire circuit conducting speech in the direction I–II, and has a transmitter 10 and receiver 11 in the lower two-wire circuit conducting speech in the direction II–I. This relation of transmitters and receivers also applies to Figure 2. The signals, such as supervisory signals, originating at transmitter 1 or transmitter 4 of system I will be referred to as signals I*s*, whereas the signals originating at transmitting relays 7 or 10 of system II will be referred to as signals II*s*. As previously remarked, both of these signals are in the voice frequency range or band. An impulse relay or an auxiliary relay, likewise not shown, but represented by contact 3, serves to interrupt or open the speech conductors of the upper two-wire circuit, and a similar impulse or auxiliary relay, indicated by the contact 12, serves to open the speech conductors of the lower two-wire circuit.

Referring first to the arrangement and operation of the system shown in Figure 1, the signals I*s*, such as supervisory signals, transmitted in the left hand telephone system I by the contact 1 of the conventional transmitting relay, are adapted to be received by the signal receiver 2 in this left hand system. In the absence of any interference preventing means, it will be seen that as long as the system interrupting contact 3 remains closed, the voice frequency signals I*s* originating in the left hand system I are able to reach the right hand system II by way of the intermediate connecting system III. For example, in the absence of such interference preventing means, the signal receiving equipment 8 of the right hand system II is able to respond unintentionally or improperly to the voice frequency signals I*s* originating in the left hand system I. To prevent this mutual interference or disturbance, a signal suppressor, indicated at 13, has been interposed between the left hand system I and the intermediate connecting system III. In its preferred embodiment, this signal suppressor 13 is directionally responsive and operates so quickly that the impulse relay of the signal receiver 8 of the right hand system II does not have time to respond before the above-mentioned signal I*s* from left hand system I is suppressed. Associated with the signal suppressor 13 is an attenuation pad of approximately 0.8 Neper. In the broad purview of my invention, it is not important at which point the signal suppressor 13 and its associated pad are inserted in the system, and hence this has not been shown in detail in the figure. Depending upon the proportion of the number of circuits to be connected through the system and the switching method employed, the signal suppressor 13 and its associated pad can be inserted on the incoming side of the left hand system I, as well as on the outgoing side of intermediate system III, or in a separate connecting element, such as cords or selectors, between the systems I and III. In the arrangement illustrated in Figure 1, the signal suppressor is located in the incoming speech direction of each system and thus protects the other system. However, it is also possible for each system to protect itself. In such case the signal suppressor should be located in the direction of out-going speech of each system. This latter arrangement is illustrated in Figure 2, wherein the signal suppressors 15 and 16 are located just in advance of contacts 4 and 7, respectively, and thereby prevent interfering signal frequencies from entering their own systems. If the left hand system I and the right hand system II are national telephone systems, and the intermediate connecting system III is an international system, it would probably be advisable to provide a signal suppressor effective in both speech directions in each country, so as to protect the national system of one country from the national system of the other country.

In the description thus far it has been assumed that the left hand system I and the right hand system II both use the same signalling frequency for both speech directions, i. e. wherein signals I*s* and signals II*s* would both be of the same frequency. This, however, is not essential. Several advantages are obtained by signalling with a different frequency in each direction of speech transmission, which direction must, however, be the same for the two systems I and II. The method applied in each system is such that one frequency is employed for the direction in which the connection is built up, i. e. in the outgoing or "go-leg," and the other frequency is employed in the opposite direction, i. e. in the incoming or "return-leg." By "go-leg" is meant the direction in which the connection is built up, such as from the operator to the called subscriber. The "return-leg" is in the opposite direction. The manner in which the 4-wire systems are interconnected, with regard to the above-mentioned directions, depends, however, on the place where the operator has been inserted in the system. Such arrangements are illustrated in Figures 3 and 4. In Figure 3 the "Operator" is at the left hand termination of left hand system I. In Figure 4 the "Operator" is approximately in the middle or midway between the systems I and III. The signalling frequency in the go-leg (from the operator to the called subscriber) has been indicated by the reference character *p* and the different signalling frequency in the return-leg (from the called subscriber to the operator) has been indicated by the reference character *q*. Figure 4 shows a bottom go-leg and a top return-leg for the called subscriber at the left hand end of the diagram, and shows a top go-leg and a bottom return-leg for the called subscriber at the right hand end of the diagram, the same data and remarks applying to both. This Figure 4 also illustrates an embodiment wherein these two different frequencies *p* and *q* are both used in the same direction of speech transmission. If, for example, the signal suppressor 13 of Figure 4 only served to suppress the signalling frequency *p*, then the signalling frequency *q* of left hand system I might interfere with the signal receiver 11 of right hand system II by way of the right hand hybrid coil arrangement, particularly if this hybrid coil arrangement were not well balanced. If, on the contrary, the signal supressor 13 of Figure 4 only served to suppress the signalling frequency *q*, then the signalling frequency *p* of left hand system I might interfere with the signal receiver 8 of right hand system II by way of an unbalanced left hand hybrid coil arrangement. The same holds good for the other signal suppressors. It is therefore desirable to have each signal suppressor respond to both signalling frequencies *p* and *q*. The attenuation of the variable attenuation network which inserts the signal suppressor at a particular input level into the connection need only have such a value that the signal receiver beyond will definitely not operate or opate no further. This means that the attenuation to be inserted should be proportionate to the input level of the signal suppressor. The impedance of the attenuation network preferably remains about constant and equal to the line impedance.

The influence of such signal suppressors on transmitted speech may be reduced to an inconsequential minimum. In view of the fact that in most cases the signalling frequency is chosen as a frequency in the higher part of the speech band, it follows that a possible response of the signal suppressor to speech will only occur if the speech contains the high frequency in sufficient strength. It should be noted, however, that in such case the volume of sound at that frequency is large, and consequently the introduction of some attenuation has only a very slight resulting effect.

In order to prevent the other frequencies in the speech band from also experiencing additional attenuation, it may be desirable to insert two band filters in parallel into the speech circuit, one band filter passing the signalling frequency or frequencies and the other band filter passing all of the other frequencies occuring in the speech band to be transmitted. The signal suppressor would then be located in the circuit of the first band filter. Attention is directed to my copending application, Serial No. 2,447 (series of 1948) filed January 15, 1948, showing such a cascade arrangement in Figure 5.

An even better arrangement may be obtained by employing a device or circuit which makes the apparatus in question (viz. the signal receiver or the signal suppressor) nonoperative if there are other frequencies present than the signalling frequency or frequencies, such as a "guard circuit." This type of "guard circuit" is a well known Swedish arrangement suggested by Ericsson. By employing such a guard circuit, the possible response of this apparatus to speech is limited to those sporadic cases in which only the signal frequency occurs in speech. This frequency must, of course, have sufficient strength for effective operation.

Each of the aforementioned signal suppressor arrangements 13, 14, 15 and 16 comprise in principle a tube circuit so connected and arranged that the normally slight attenuation of such circuit is increased under the influence of the signalling frequencies, whereby to effectuate a blocking of the circuit for these signalling frequencies and according to which the subsequent signal receiver that belongs to the other telephone system is not influenced. This arrangement is further characterized in that the network that is controlled by the tube circuit, dependent upon the amplitude of the signalling frequencies, introduces an attenuation the magnitude of which is continuously dependent upon the amplitude of the signal frequencies.

The above introduction of attenuation is only made effective for amplitudes of the signalling frequencies being somewhat smaller than the smallest amplitude causing a signalling operation in the circuit, such attenuation thereby introduced being such that the starting amplitude of the signalling frequencies is also somewhat smaller than the above-mentioned smallest amplitude value.

With reference to Figure 5, a more detailed understanding may be had by consideration of a signal receiver 4 which is shown thereat in operative relation with a suppressor unit 5, 6. The manner in which each of these units may be individually used in the representative blocks 5*a*, 5*b*, 6*a* and 6*b*, of Figures 1 to 5, inclusive, becomes apparent with reference to the following description of these figures.

The suppressor device, which is shown at A in Figure 5, is arranged to be operative responsive to the direction of flow of the direct current therethrough to provide variable attenuations of the speech currents in the associated line. The attenuator unit, by reason of its filter configurations, has an extremely steep attenuation characteristic, whereby with the presence of small positive values of direct current, very little attenuation of the speech currents is effected and with the presence of a very small negative value of direct current the attenuation of the speech currents is quite large. The electronic detector tube V2 connected in the arrangement is normally nonconductive and accordingly positive direct current is normally provided for the suppressor circuit whereby little attenuation of the speech currents is effected. However with receipt of a frequency in the signal range, the flow of negative direct current in the suppressor circuit is effected and a very high attenuation for the speech current is provided.

With reference to Figure 5, the incoming terminals 21 and 22 and the outgoing terminals 23 and 24 are connected to a network comprising a group of resistances R14, R15, R16, R17, R18, R19, and R21 and a series of rectifier units G3 and G4, G5 and G6 which are arranged with the resistances to effect the aforedescribed attenuator operating characteristics. Resistances R14, R15, R16, and R17 are adapted to terminate the connecting lines in such a manner as to avoid interfering reflections of the signal at the operating frequencies of the system.

The signal receiver 4, which is shown in operative combination with the suppressor A, may comprise a conventional repeater stage B, a filter arrangement C which is operative to provide bias voltages which are proportional to the values of the speech and signal frequencies, and an electronic detector D which is operated by the potentials of the filter arrangement to control the operations of an associated signal relay R and the suppressor device A. The output circuit of the detector arrangement D is shown connected to the suppressor unit A by a variable resistance member R13 and a low pass filter arrangement comprising coil units L4, L5, L6, L7, condenser units C10 and C11.

The repeater stage B may be comprised of a conventional telephone repeater unit, and as illustrated in the present embodiment, includes incoming terminals 25 and 26 which are connected through the primary winding of an input transformer unit TR1 to a thermionic amplifier tube V1 and its associated resistance and capacitance networks including R1, C1 and R2, R3. The output circuit of the thermionic tube is connected over the primary winding of transformer TR2 to a positive potential source of 250 volts and over resistance R4 and condenser C2 to the tube suppressor grid and cathode. The secondary windings of transformer TR2 are connected to the filter networks of unit C, the upper band filter of which is arranged to receive and pass the full frequency width and which is comprised of a rectifier G1, resistance R5, condenser C7, and resistance R10.

The lower filter unit, which is somewhat similar to the well known, three element $\pi$ section type filter, comprises a resistance R6, parallel condenser C3 and coil L1, condenser C4, parallel condenser C5, and coil L2, resistance R7, rectifier G2, condenser C6 and resistance R8, which are arranged to pass the part of the speech frequencies that are situated in the signal band, that is, to give a low attenuation for the signal frequency and the necessary side bands.

The output of the lower band filter appears across resistance R8 and the output of the upper band filter appears across resistance R10, both of which resistances are connected to the grid of the thermionic tube of the detector stage D. Resistance R9 is connected in the cathode circuit of the thermionic detector tube and to the output circuit of the lower band filter. The plate or output circuit of the thermionic detector tube V2 is connected over a low pass filter comprising coil L3 and condensers C8 and C9, to a signal relay R, a resistance R12 and a positive 250 volt power supply.

The low pass filter in its connection between the output of the tube and the signal relay is effective to prevent interferences of short duration in the spectrum of the signal frequency from operating the signal relay R. Contact *r1* of the signal relay is arranged to pass the signal on to the telephone exchange in an obvious manner.

The output circuit of the thermionic detector tube is connected to the suppressor device A by a low pass filter E which comprises coils L4, L5, L6, L7, and condenser C10, C11. The low pass filter E is effective to eliminate the high frequency alternating current of the signalling tone from the suppressor circuit A and is arranged to have a high cut off frequency (1500 to 2000 cycles per second) whereby the operation of the suppressor is uneffected thereby.

With the receipt of speech current over the line, the repeater unit B is operative to amplify the speech current, and transmit the amplified speech signal over the transformer unit TR2 to the band filtering devices of unit C. The portion of the speech frequencies which are situated in the lower band filter transmission band are rectified by rectifier G2 and a positive voltage appears across resistance R8 for application to the grid of the detector tube V2.

Rectifier G1 rectifies the full frequency width and with receipt of the speech current effects the provision of a proportionate negative voltage across R10 for application to the grid of the detector tube V2. Inasmuch as with the presence of speech current, the negative voltage which appears across R10 will be considerably greater than the positive voltage which appears across resistance R8, the detector tube will be maintained biased in its cut-off position, and there will be no attenuation of the speech current.

The lower network of the attenuator will therefore be energized by positive current from the 250 volt potential source over resistance R12, coils L6 and L7, resistance R19, rectifier G6, coils O and P, rectifier G5, resistance R18, coils L4 and L5, resistances R13 and R9 to ground. Signal relay R will accordingly remain inoperative, and the speech currents will be transmitted over the lower path of the network with little attenuation.

On receipt of a signal frequency at terminals 25 and 26 of the signal receiver, the signal is amplified by the electronic amplifier tube V1 and transmitted over transformer TR2 to the band filter device F. Rectifier G2 will be operative to provide a positive voltage across R8 which is somewhat greater than the negative voltage provided by rectifier G1 across resistance R10, and accordingly detector tube V2 becomes conductive. Signal relay R is responsively operated over a path extending from the positive potential source over resistance R12, the signal relay R, the low filter network detector tube V2 and resistance R9 to ground. A parallel path for the upper portion of the attenuating network is simultaneously completed, such path extending from the positive potential source over resistance R13, coils L4 and L5, coils M, resistances R14 and R16, rectifier G3, resistance R21, rectifier G4, resistances R15 and R17, coils M, coils L6 and L7, the signal relay R, detector tube V2 and resistance R9 to ground. A very high attenuation is thus effected in the suppressor unit to suppress the speech currents in the telephone line. Signal relay R at its contacts *r1* effects the passage of the signal to the telephone exchange in an obvious manner.

In that the signal relay is connected to the output of the detector tube V2 over a low pass filter arrangement, the interferences of short duration in the spectrum of the signal frequency do not operate the signal relay R. However, the current through the barring device A is not delayed so that the barring device experiences a certain reaction in the case of short interferences in the spectrum of the signal frequency which are of sufficiently high level. The degree of interference is dependent upon the value of the compensation current provided for the suppressor unit which is determined by the amount of resistance inserted in the circuit by the adjustment of variable resistance R13. The degree of interference is also strongly influenced by the choice of the signal frequency, a signal frequency of 2000 and 3000 cycles per second having been determined as being particularly well adapted for use in the described installation.

The interferences can be further reduced by providing a barring current circuit with a sufficiently low cut-off frequency. However, in applying this measure, the barring device may remain inoperative for too long a period with the occurrence of a signalling operation and the passing tone may cause a fault in the next exchange. To eliminate the last mentioned fault a delay circuit such as shown in Figure 6 may be provided to increase the operation time.

While I have illustrated and described what I regarded to be the preferred embodiments of my invention, nevertheless it will be understood that such are merely exemplary and that numerous modifications and rearrangements may be made therein without departing from the essence of the invention.

I claim:

1. In telephone systems of the class described, the combination of a four-wire end system I, a four-wire end system II and a four-wire intermediate system III including means for interconnecting said end systems I and II, each of said systems comprising a two-wire circuit for speech transmission in one direction and a two-wire circuit for speech transmission in the other direction, signal transmitting means and signal receiving means in said end system I for transmitting and receiving a signalling frequency for effecting the performance of supervisory operations in end system I, signal transmitting means and signal receiving means in end system II for transmitting and receiving a signalling frequency for effecting the performance of supervisory operations in end system II, and signal suppressing means connected in said directional two-wire circuits which are operative without interrupting the existing circuit interconnections between the systems to prevent signalling frequencies in said end system I from causing improper operation of the signal receiving means in end system II, and to prevent signalling frequencies in said end system II from causing improper operation of said signal receiving means in end section I.

2. In telephone interconnecting systems of the class described, the combination of a four-wire telephone system I, a four-wire telephone system II, and a four-wire intermediate system III which have means for interconnecting said systems I and II, each of said systems comprising a two-wire circuit for speech transmission in one direction and a two-wire circuit for speech transmission in the other direction, signal transmitting means and signal receiving means connected in system I for transmitting and receiving a signalling frequency in the voice frequency band for effecting the performance of supervisory operations in system I, signal transmitting and signal receiving means connected in system II for transmitting and receiving a signalling frequency in the voice frequency band for effecting the performance of supervisory operations in system II, signal suppressing means connected in one of the two-wire circuits of said intermediate system for attenuating the signalling frequencies as used in said system I to prevent same from causing improper operation of the signal receiving means in system II, and signal suppressing means in the other two-wire circuit of said intermediate system for attenuating the signalling frequencies as used in system II to prevent same from causing improper operation of the signal receiving means in system I.

3. In telephone interconnecting systems of the class described, the combination of a four-wire telephone system I, a four-wire telephone system II, and a four-wire intermediate system III having means for interconnecting said systems I and II, each of said systems comprising a two-wire circuit for speech transmission in one direction and a two-wire circuit for speech transmission in the other direction, signal transmitting means and signal receiving means connected in system I for transmitting and receiving a signalling frequency in the voice frequency band for effecting the performance of supervisory operations in system I, signal transmitting and signal receiving means connected in system II for transmitting and receiving a signalling frequency in the voice frequency band for effecting the performance of supervisory operations in system II, signal suppressing means connected in one of the two-wire circuits of said intermediate system for attenuating the signalling frequencies as used in system I to prevent same from causing improper operation of the signal receiving means in system II, and signal suppressing means connected in the other two-wire circuit of said intermediate system for preventing signalling frequencies as used in system II from causing improper operation of the signal receiving means in system I, each of said signal suppressing means comprising a variable attenuation network and thermionic tube means controlling said network.

4. In telephone interconnecting systems of the class described, the combination of a four-wire telephone system I, a four-wire telephone system II, a four-wire intermediate system III, means for establishing an interconnection between systems I and II by way of intermediate system III, each of said systems comprising a two-wire circuit for speech transmission in one direction and a two-wire circuit for speech transmission in the other direction, signal transmitting means and signal receiving means connected in system I for transmitting and receiving a signalling frequency in the voice frequency band for effecting the performance of supervisory operations in system I, signal transmitting means and signal receiving means connected in system II for transmitting and receiving a signalling frequency in the voice frequency band which is of a different value than said signalling frequency of said system I for effecting the performance of supervisory operations in system II, signal suppressing means connected with the two-wire circuit of said intermediate system III which transmits speech in the direction I–II, said signal suppressing means being directionally responsive to attenuate signalling frequencies as used in system I so as to prevent sufficient transmission of said signalling frequencies to system II for causing operation of the signal receiving means in system II, and signal suppressing means connected with the other two-wire circuit of intermediate system III which conducts speech in the direction II–I, said latter signal suppressing means being also directionally responsive to attenuate signalling frequencies as used in system II so as to prevent sufficient transmission of said signalling frequencies to system I for causing operation of the signal receiving means in system I.

5. The invention as set forth in claim 4 wherein each signal suppressing means comprises a variable attenuation network and thermionic tube means controlling the network, and wherein each signal suppressing means is effective to attenuate both signalling frequencies at their different frequency levels that may be travelling in the same direction in the respective two-wire circuit of that suppressor.

6. In telephone interconnecting systems of the class described, the combination of a four-wire telephone system I, a four-wire telephone system II, means for establishing an interconnection between systems I and II, each of said systems comprising a two-wire circuit for speech transmission in one direction and a two-wire circuit for speech transmission in the other direction, signal transmitting means and signal receiving means connected in system I for transmitting and receiving a signalling frequency *p* for effecting the performance of supervisory operations in system I, signal transmitting means and signal receiving means connected in system II for transmitting and receiving a signalling frequency *q* for effecting the performance of supervisory operations in system II, signalling frequency *p* and signalling frequency *q* being at different frequency levels but both being in the voice frequency band, signal suppressing means which are operative without interrupting the interconnections between the systems, connected in one of said two-wire circuits for preventing the signalling frequencies *p* originating in system I from causing operation of the signal receiving means in system II, signal suppressing means which are operative without interrupting the interconnections between the systems, connected in another of said two-wire circuits for preventing signalling frequencies *q* as used in system II from causing operation of the signal receiving means in system I, terminating units including hybrid coils connected at the outer ends of systems I and II, two-wire extensions extending outwardly from said terminating units, an operator's station connected in one of said two-wire extensions and a subscriber's station connected in the other of said two-wire extensions.

7. In telephone interconnecting systems of the class described, the combination of a four-wire telephone system I, a four-wire telephone system II, each of said systems comprising a two-wire circuit for speech transmission in one direction and a two-wire circuit for speech transmission in the other direction, means for interconnecting systems I and II including an operator's station, signal transmitting and signal receiving means connected with one of said two-wire circuits for transmitting and receiving a signalling frequency *p* in the voice frequency band for effecting the performance of supervisory operations, signal transmitting and signal receiving means connected with another of said two-wire circuits for transmitting and receiving a signalling frequency *q* in the voice frequency band for effecting the performance of supervisory operations, a two-wire circuit extending outwardly beyond the end of system I for connection to a called subscriber, a two-wire system extending outwardly beyond the end of system II for connection to a called subscriber, signal suppressing means connected in one of said two-wire circuits for attenuating the transmission of the signalling frequencies *p* beyond said signal suppressing means, and signal suppressing means connected in another of said two-wire circuits for attenuating the transmission of signalling frequencies *q* beyond said latter signal suppressing means.

8. In telephone interconnecting systems of the class described, the combination of a four-wire telephone system I, a four-wire telephone system II, means for establishing an interconnected relationship between said two systems, each of said systems comprising a two-wire circuit for speech transmission in one direction and a two-wire circuit for speech transmission in the other direction, signal transmitting and signal receiving means connected with one of said two-wire circuits for receiving and transmitting a signalling frequency in the voice frequency range for effecting the performance of supervisory operations, and signal suppressing means connected with said latter two-wire circuit for attenuating said signalling frequencies arising in one sytem to prevent same from causing false operation of the signal receiving means in the other system.

WILLEM C. DE VRIES.

REFERENCES CITED

The following references are of record in the file of this patent:

UNITED STATES PATENTS

| Number | Name | Date |
|---|---|---|
| 1,673,023 | Rittenmyre | June 12, 1928 |
| 1,865,952 | Pffiffner | July 5, 1932 |
| 2,117,835 | Black | May 7, 1938 |
| 2,253,393 | Pakala | Aug. 19, 1941 |
| 2,385,673 | Woolworth | Sept. 25, 1945 |
| 2,388,001 | Laughren | Oct. 30, 1945 |
| 2,421,727 | Thompson | June 3, 1947 |

FOREIGN PATENTS

| Number | Country | Date |
|---|---|---|
| 489,609 | Great Britain | July 25, 1938 |